United States Patent
Sugiyama et al.

(10) Patent No.: US 11,560,170 B2
(45) Date of Patent: Jan. 24, 2023

(54) AUXILIARY POWER SUPPLY DEVICE AND ELECTRIC POWER STEERING SYSTEM

(71) Applicant: JTEKT CORPORATION, Osaka (JP)

(72) Inventors: Toyoki Sugiyama, Kitakatsuragi-gun (JP); Satoshi Shinoda, Neyagawa (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/717,284

(22) Filed: Dec. 17, 2019

(65) Prior Publication Data
US 2020/0207404 A1 Jul. 2, 2020

(30) Foreign Application Priority Data
Dec. 27, 2018 (JP) .............................. JP2018-246005

(51) Int. Cl.
  H02P 21/14 (2016.01)
  H02P 9/10 (2006.01)
  B62D 5/04 (2006.01)
  H02J 7/00 (2006.01)
  H02M 3/155 (2006.01)

(52) U.S. Cl.
  CPC ................ B62D 5/04 (2013.01); H02J 7/007 (2013.01); H02M 3/155 (2013.01)

(58) Field of Classification Search
  CPC ....... B60W 10/06; B60W 20/10; B60W 20/13
  See application file for complete search history.

(56) References Cited

U.S. PATENT DOCUMENTS

| | | | |
|---|---|---|---|
| 2009/0306841 A1* | 12/2009 | Miwa ...................... | B60L 53/24 701/31.4 |
| 2010/0264857 A1* | 10/2010 | Nagase ................ | B62D 5/0484 318/139 |
| 2014/0136055 A1* | 5/2014 | Sugiyama .............. | B62D 5/046 701/42 |
| 2015/0001926 A1* | 1/2015 | Kageyama .............. | E05B 81/86 307/10.1 |
| 2017/0210413 A1 | 7/2017 | Tsujioka | |
| 2020/0298820 A1* | 9/2020 | Shokaku ............... | B60W 10/26 |

FOREIGN PATENT DOCUMENTS

JP  2010-000903 A  1/2010

OTHER PUBLICATIONS

Oct. 30, 2020 Search Report issued in European Patent Application No. 19217413.4.

* cited by examiner

*Primary Examiner* — Muhammad S Islam
*Assistant Examiner* — Charles S Laughlin
(74) *Attorney, Agent, or Firm* — Oliff PLC

(57) ABSTRACT

An auxiliary power supply device includes an auxiliary power source and a booster circuit. The auxiliary power supply device is configured to be switched among a charging state, a holding state, and a discharging state. The auxiliary power source is configured to be switched between a serial connection mode and a parallel connection mode. The auxiliary power source is configured to perform boosting to supply power to the power supply target when the auxiliary power source is switched to the serial connection mode, and perform backup when the auxiliary power source is switched to the parallel connection mode.

2 Claims, 5 Drawing Sheets

|  | FET | | | | | | | |
|---|---|---|---|---|---|---|---|---|
|  | 1 | 2 | 3 | 4 | 5 | 6 | 7 | 8 |
| HOLDING STATE | OFF | OFF | OFF | ON | OFF | ON | OFF | OFF |
| CHARGING STATE | PWM | PWM | OFF | ON | ON | ON | OFF | OFF |
| DISCHARGING STATE (BOOSTING) | OFF | OFF | ON | OFF | OFF | ON | OFF | OFF |
| DISCHARGING STATE (BACKUP) | PWM | PWM | ON | OFF | OFF | OFF | ON | ON |

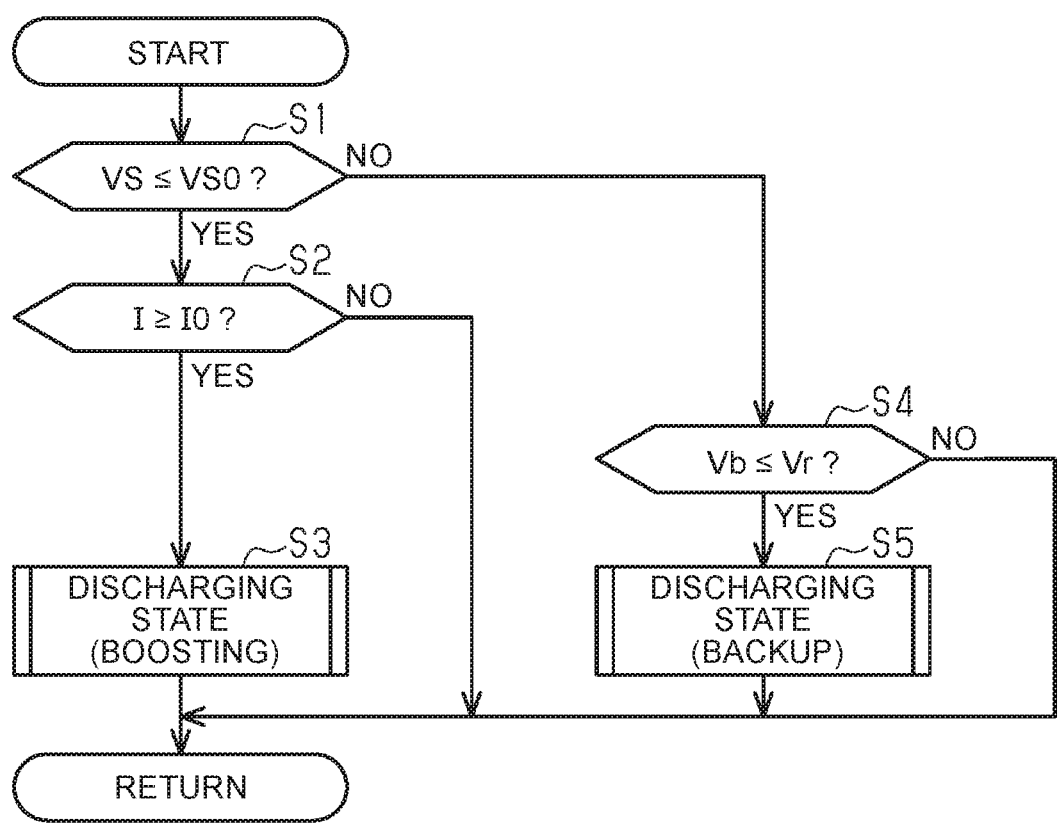

AUXILIARY POWER SUPPLY DEVICE AND ELECTRIC POWER STEERING SYSTEM

INCORPORATION BY REFERENCE

The disclosure of Japanese Patent Application No. 2018-246005 filed on Dec. 27, 2018 including the specification, drawings and abstract is incorporated herein by reference in its entirety.

BACKGROUND

1. Technical Field

The disclosure relates to an auxiliary power supply device and an electric power steering system.

2. Description of Related Art

There is known an electric power steering system (hereinafter referred to as "EPS") that assists a driver's steering operation by applying a rotational force of a motor as a steering assist force to a steering mechanism of a vehicle. A control device of the EPS controls driving of the motor by controlling power supply to the motor. The control device of the EPS is operated by power supplied from a battery.

With enhancing performance of the EPS, the power required to drive the motor is increasing. Thus, there is a demand for higher output of the power supplied to the motor. When the battery fails and the power supplied from the battery to the motor cannot be obtained, a steering operation assisting function cannot be continued. Reflecting these circumstances, in the related art disclosed in Japanese Unexamined Patent Application Publication No. 2010-903 (JP 2010-903 A), the EPS is provided with an auxiliary power source connected in series with the battery and an auxiliary power source connected in parallel to the battery. When high output is required, the auxiliary power source connected in series with the battery is used to achieve a function of boosting the power supplied from the battery to the motor. When the battery fails, the auxiliary power source connected in parallel to the battery is used to achieve a function of backing up the power supplied to the motor.

SUMMARY

A circuit is configured such that, for the boosting and the backup, when a voltage required for the backup is larger than that required for the boosting and when the voltages of the auxiliary power sources are the same, the number of auxiliary power sources used for backup is larger than the number of auxiliary power sources used for boosting. In order to make the circuit configuration compact, there is a case that requires shared auxiliary power sources that can be used for both boosting and backup. In this case, a configuration in which a part of the auxiliary power source used for backup is also used for boosting can be considered. In this configuration, for boosting, the auxiliary power source that is shared is in a discharging state, while the auxiliary power source that is not shared is maintained in a holding state. Therefore, for backup, the power supply to the motor is backed up using the auxiliary power sources with different charging states. In view of this, a voltage of the power supplied from the auxiliary power sources to the motor varies between cases where the power supply to the motor is backed up using the auxiliary power sources with different charging states, and where the power supply to the motor is backed up using the auxiliary power sources with the same charging states. Thus, it has been difficult to share the auxiliary power source between boosting and backup.

The disclosure allows the auxiliary power source to be shared between boosting and backup.

An auxiliary power supply device according to a first aspect of the present disclosure includes an auxiliary power source and a booster circuit for boosting input voltage. The auxiliary power supply device is provided in a power supply path extending from a main power source to a power supply target, and configured to be switched among a charging state for charging the auxiliary power source, a holding state for holding a charge voltage of the auxiliary power source, and a discharging state for discharging power from the auxiliary power source. The auxiliary power source is configured to be switched between a serial connection mode and a parallel connection mode. The serial connection mode is a mode in which a first terminal is connected to the main power source and a second terminal is connected to the power supply target, and the auxiliary power source is connected in series between the main power source and the power supply target. The parallel connection mode is a mode in which the first terminal is connected to a part between the main power source and the power supply target, at which the main power source and the power supply target are connected in series. The auxiliary power source is configured to boost a voltage supplied from the main power source by a discharge voltage of the auxiliary power source to supply power to the power supply target when the auxiliary power source is switched to the serial connection mode. The auxiliary power source is configured such that the second terminal is connected to an input terminal of the booster circuit, the discharge voltage of the auxiliary power source, which is an input voltage of the booster circuit, is boosted, and backup to supply the boosted discharge voltage to the power supply target is performed when the auxiliary power source is switched to the parallel connection mode.

According to the above configuration, in order to make the circuit configuration of the auxiliary power supply device compact, the auxiliary power source is configured to be switched between the serial connection mode and the parallel connection mode. The serial connection mode is a mode in which the auxiliary power source is connected in series between the main power source and the power supply target. The parallel connection mode is a mode in which the first terminal is connected to a part between the main power source and the power supply target, at which the main power source and the power supply target are connected in series. The serial connection mode and the parallel connection mode share the same auxiliary power source. In other words, the shared auxiliary power source is used for both backup and boosting. Assuming that the auxiliary power source has a smaller power source capacitance than the main power source does, in the configuration above, the booster circuit boosts the discharge voltage from the auxiliary power source, which is the input voltage of the booster circuit, for backup. As a result, since all the auxiliary power sources are in the discharging state for boosting, for backup, the power supply to the power supply target is not backed up using an auxiliary power source with different charging states. Thus, since it is possible to suppress variation in the discharge voltage from the auxiliary power source, it is possible to stabilize the discharge voltage from the auxiliary power source for backup.

In the auxiliary power supply device according to the above aspect, the auxiliary power source may be configured to be switched to the parallel connection mode, when power is supplied from the main power source to the power supply target, such that the second terminal is connected to an output terminal of the booster circuit, the input terminal of the booster circuit is connected to the main power source, an output voltage of the main power source, which is the input voltage of the booster circuit, is boosted, and the auxiliary power source is charged by the boosted output voltage.

According to the above configuration, the shared booster circuit is used for both backup and charging the auxiliary power source. Thus, compared with the case where the booster circuit used for charging the auxiliary power source and the booster circuit used for backup are separately provided in the auxiliary power supply device, the circuit configuration of the auxiliary power supply device can be made further compact because the configuration of the booster circuit is shared.

An electric power steering system according to a second aspect of the present disclosure includes a motor serving as a power supply target, a main power source, an auxiliary power supply device provided in a power supply path extending from the main power source to the motor and including an auxiliary power source and a booster circuit for boosting an input voltage, and an electronic control unit. The electronic control unit is configured to i) switch the auxiliary power source between a serial connection mode and a parallel connection mode, the serial connection mode being a mode in which a first terminal is connected to the main power source and a second terminal is connected to the motor, and the auxiliary power source is connected in series between the motor and the main power source, the parallel connection mode being a mode in which the first terminal is connected to a part between the main power source and the power supply target, at which the main power source and the power supply target are connected in series, ii) switch among a charging state for charging the auxiliary power source, a holding state for holding a charge voltage of the auxiliary power source, and a discharging state for discharging power from the auxiliary power source, and iii) switch the auxiliary power source between the serial connection mode and the parallel connection mode. The auxiliary power source is configured to boost a voltage supplied from the main power source by a discharge voltage of the auxiliary power source to supply power to the motor when the electronic control unit switches the auxiliary power source to the serial connection mode. The auxiliary power source is configured such that the second terminal of the auxiliary power source is connected to an input terminal of the booster circuit, the discharge voltage of the auxiliary power source, which is an input voltage of the booster circuit, is boosted, and backup to supply the boosted discharge voltage to the motor is performed when the electronic control unit switches the auxiliary power source to the parallel connection mode.

According to the above configuration, in order to make the circuit configuration of the auxiliary power supply device compact, the electronic control unit is configured to switch the auxiliary power source between the serial connection mode and the parallel connection mode. The serial connection mode is a mode in which the auxiliary power source is connected in series between the motor and the main power source. The parallel connection mode is a mode in which the first terminal of the auxiliary power source is connected to a part between the main power source and the motor, at which the main power source and the motor are connected in series. The serial connection mode and the parallel connection mode share the same auxiliary power source. In other words, the shared auxiliary power source is used for both backup and boosting. Assuming that the auxiliary power source has a smaller power source capacitance than the main power source does, in the configuration above, the booster circuit boosts the discharge voltage from the auxiliary power source, which is the input voltage of the booster circuit, for backup. As a result, since all the auxiliary power sources are in the discharging state for boosting, for backup, the power supply to the power supply target is not backed up using an auxiliary power source with different charging states. Thus, since it is possible to suppress variations in the discharge voltage from the auxiliary power source, it is possible to stabilize the discharge voltage from the auxiliary power source for backup. Thus, the electric power steering system capable of stabilizing the discharge voltage from the auxiliary power source can be achieved.

In the electric power steering system according to the above aspect, the electronic control unit may be configured to switch the auxiliary power source to the parallel connection mode, when the auxiliary power source supplies power from the main power source to the power supply target, such that the second terminal is connected to an output terminal of the booster circuit, the input terminal of the booster circuit is connected to the main power source, an output voltage of the main power source, which is the input voltage of the booster circuit, is boosted, and the auxiliary power source is charged by the boosted output voltage.

According to the first and second aspects described above, it is possible to share the auxiliary power source between boosting and backup.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a flowchart showing a determination procedure of a state of power supply control of the auxiliary power supply device.

DETAILED DESCRIPTION OF EMBODIMENTS

Figure 1:
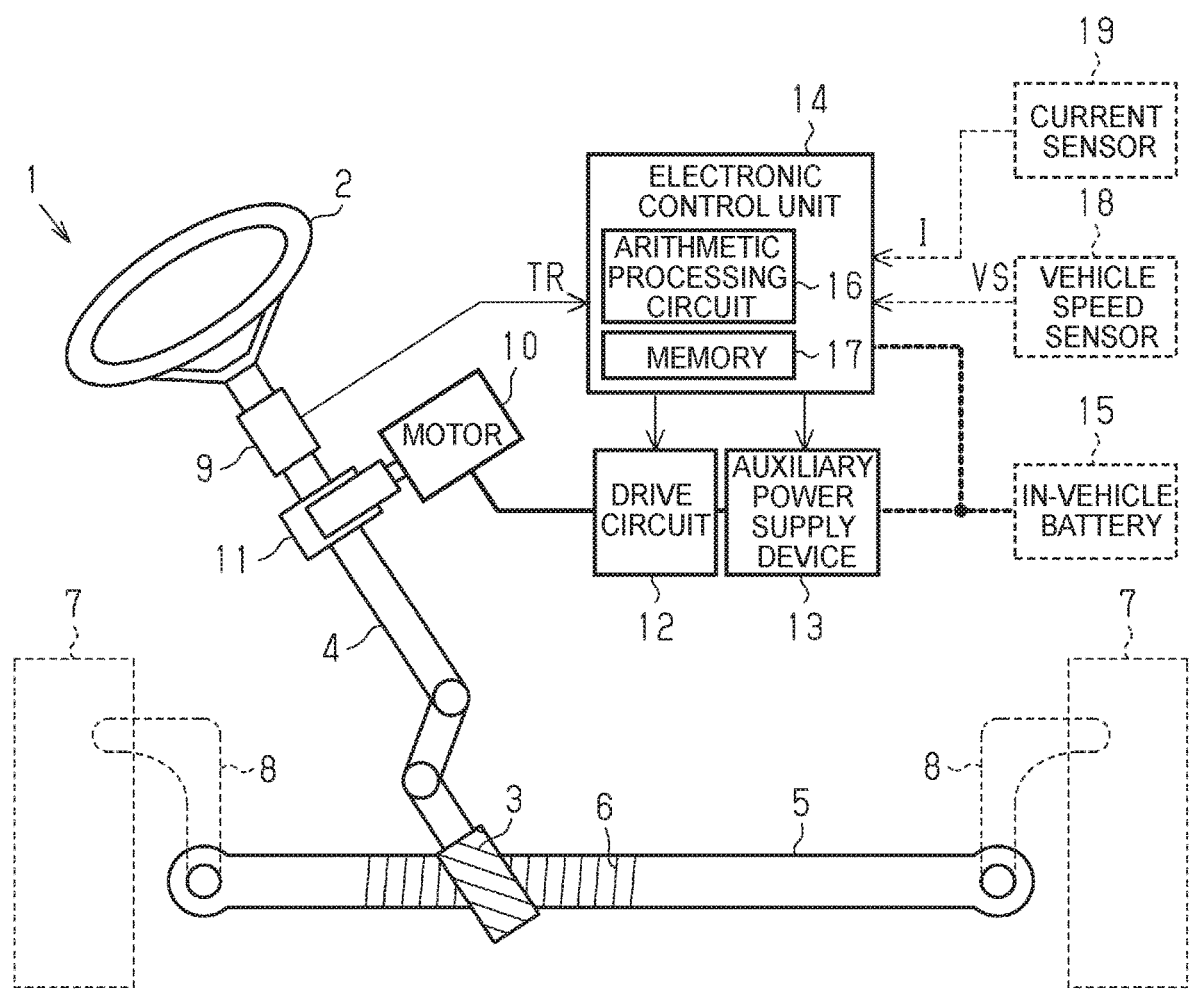
FIG. 1 is a diagram showing a schematic configuration of a steering system equipped with an auxiliary power supply device.

A first embodiment in which an auxiliary power supply device is applied to an electric power steering system (hereinafter referred to as "EPS") will be described. As shown in FIG. 1, an EPS 1 of the embodiment includes a steering shaft 4. A steering wheel 2 is fixed to one end of the steering shaft 4, and a pinion gear 3 is provided to the other end thereof. The pinion gear 3 meshes with a rack gear 6 provided on a rack shaft 5. The pinion gear 3 and the rack gear 6 constitute a rack and pinion mechanism. A rotational motion of the steering shaft 4 is converted into a reciprocating linear motion of the rack shaft 5 in a longitudinal direction of the rack shaft 5 (in a right and left direction in FIG. 1) via the rack and pinion mechanism. The EPS 1 is assembled to a vehicle so that the longitudinal direction of the rack shaft 5 matches a vehicle width direction. The reciprocating linear motion of the rack shaft 5 is transmitted to the right and left steered wheels 7 via tie rods 8 connected to both ends of the rack shaft 5. Thereby, a steered angle of the steered wheels 7 is changed, and a traveling direction of the vehicle is changed.

The steering shaft 4 is equipped with a torque sensor 9 for measuring a steering torque TR applied to the steering shaft 4 by an operation of the steering wheel 2. The torque sensor 9 of the embodiment detects a torsion amount of a torsion bar that constitutes a part of the steering shaft 4 and measures the steering torque TR based on the torsion amount.

A steering assist motor 10 is connected to the steering shaft 4 via a speed reducer 11. The speed reducer 11 reduces speed of rotation output from the motor 10 and transmits a rotational force with reduced speed to the steering shaft 4. A three-phase brushless motor is employed as the motor 10 in the embodiment. A worm gear mechanism is employed as the speed reducer 11 in the embodiment.

The EPS 1 includes a drive circuit 12, an auxiliary power supply device 13, and an electronic control unit 14. A known circuit including two switching elements for each phase (U phase, V phase, and W phase) of the motor 10 is employed as the drive circuit 12. When the EPS 1 is assembled to the vehicle, the auxiliary power supply device 13 and the electronic control unit 14 are connected to an in-vehicle battery 15 serving as a main power source.

The electronic control unit 14 includes an arithmetic processing circuit 16 that executes arithmetic processing related to the control of the EPS 1, and a memory 17 in which a program and data for the control are stored. The torque sensor 9 described above is connected to the electronic control unit 14. When the EPS 1 is assembled to the vehicle, a vehicle speed sensor 18 is connected to the electronic control unit 14. The vehicle speed sensor 18 is installed in the vehicle and detects a traveling speed VS of the vehicle. Further, a current sensor 19 is connected to the electronic control unit 14. The current sensor 19 detects an actual current value I of a power supply from the auxiliary power supply device 13 to the drive circuit 12. Specifically, the current sensor 19 detects the actual current value I of an output port 21 (see FIG. 2) of the auxiliary power supply device 13.

With the EPS 1 assembled to the vehicle, the electronic control unit 14 controls a steering assist force applied by the motor 10. When controlling the steering assist force, the electronic control unit 14 determines a target steering assist force that is a target value of the steering assist force based on the steering torque TR and the traveling speed VS. The electronic control unit 14 controls the operation of the drive circuit 12 and the auxiliary power supply device 13 so as to generate a steering assist force corresponding to the target steering assist force.

Figures 2, 3:
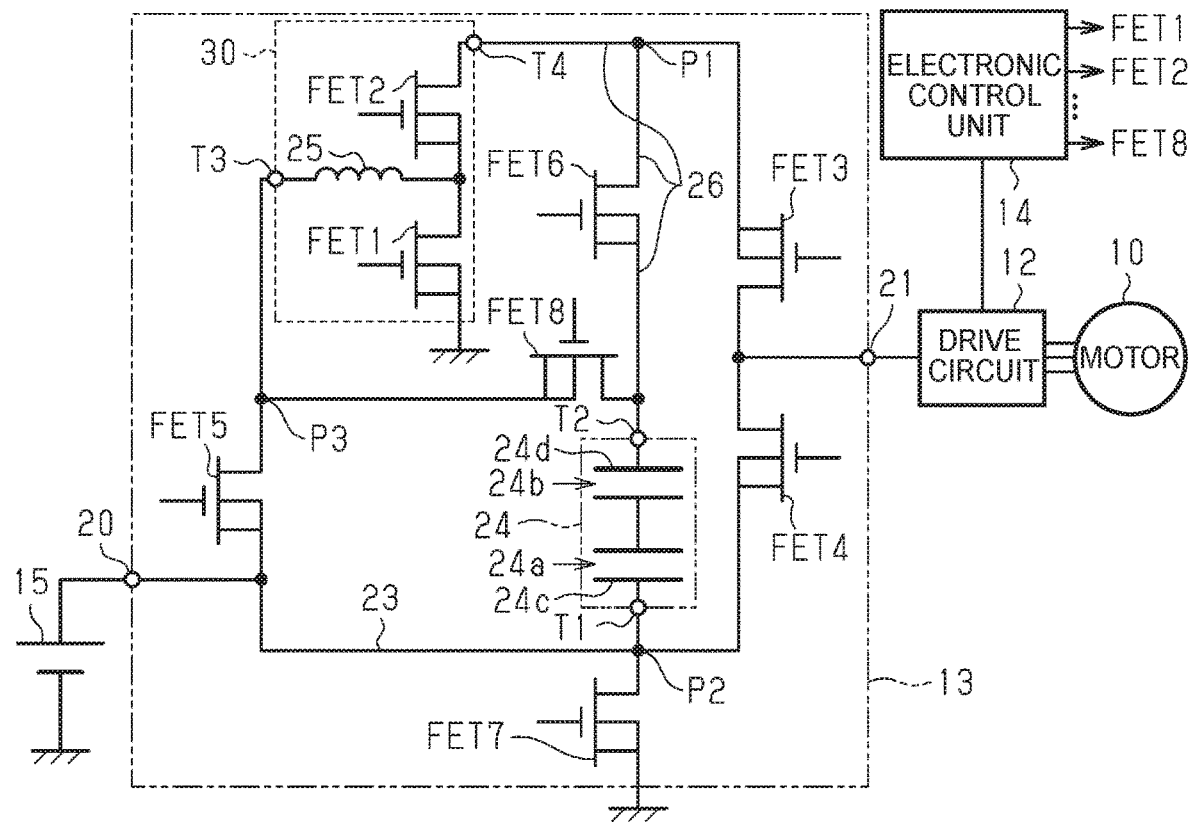
FIG. 2 is a circuit diagram showing a configuration of an electric circuit of the auxiliary power supply device.
FIG. 3 is a table showing operation states of switching elements in respective operation states of the auxiliary power supply device.

As shown in FIG. 2, the auxiliary power supply device 13 includes an input port 20 and the output port 21. The input port 20 is connected to the in-vehicle battery 15 when the EPS 1 is assembled to the vehicle. The output port 21 is connected, via the drive circuit 12, to the motor 10 that is a power supply target when the auxiliary power supply device 13 is assembled to the EPS 1.

The auxiliary power supply device 13 includes a first line 23, which is a line serving as a power supply path in a holding state and a charging state described later. The first line 23 is a wiring connected to the input port 20 and the output port 21.

The auxiliary power supply device 13 includes an auxiliary power source 24 capable of charging and discharging electric charges. The auxiliary power source 24 is connected between the in-vehicle battery 15 and the motor 10 so as to be switched between a serial connection mode and a parallel connection mode. In the serial connection mode, the in-vehicle battery 15 and the motor 10 are connected in series. In the parallel connection mode, a first terminal T1 is connected to a connection point P2 on the first line 23. The connection point P2 is a part between the in-vehicle battery 15 and the motor 10, at which the in-vehicle battery 15 and the motor 10 are connected in series. The auxiliary power source 24 includes two capacitors 24a and 24b. The number of capacitors 24a and 24b provided in the auxiliary power source 24 is determined in consideration of a capacitance of the capacitors 24a and 24b with respect to a voltage required by the EPS 1. The capacitors 24a and 24b each include an electrode plate having a positive polarity and an electrode plate having a negative polarity. The first terminal T1 of a negative electrode plate 24c of the capacitor 24a is connected to the first line 23, and a second terminal T2 of a positive electrode plate 24d of the capacitor 24b is connected to a second line 26, which is a line serving as a power supply path used for boosting and backup described later. When the auxiliary power source 24 is considered as a whole, the auxiliary power source 24 is charged between the negative electrode plate 24c of the capacitor 24a and the positive electrode plate 24d of the capacitor 24b. When the auxiliary power source 24 is switched to the serial connection mode, the first terminal T1 is connected to the in-vehicle battery 15 via the first line 23, and the second terminal T2 is connected to the motor 10 via the second line 26. When the auxiliary power source 24 is switched to the parallel connection mode, the first terminal T1 is connected to the ground via the first line 23, and the second terminal T2 is connected to the motor 10 via the second line 26. In the embodiment, lithium ion capacitors are employed as the capacitors 24a and 24b.

The lithium ion capacitor has advantages of good heat resistance, long life, good charge/discharge performance, high energy density, and high safety. Meanwhile, an electric double layer capacitor has advantages of good heat resistance, long life, good charge/discharge performance, and high safety, but has disadvantages of low energy density and a likeliness to increase in size when heat resistance is increased. In the embodiment, since the lithium ion capacitors are employed as the capacitors 24a and 24b, the capacitors 24a and 24b have the above advantages.

The auxiliary power supply device 13 includes a chopper coil 25 that is a boosting coil. One end of the chopper coil 25 is connected to the ground via a first switching element (hereinafter referred to as "FET 1") and to the second line 26 via a second switching element (hereinafter referred to as "FET 2"). The chopper coil 25, the FET 1, and the FET 2 constitute a booster circuit 30 that boosts an input voltage. The booster circuit 30 is connected so as to be switched to the in-vehicle battery 15 or the second terminal T2 of the auxiliary power source 24. The other end of the chopper coil 25 is connected to the first line 23 via a fifth switching element (hereinafter referred to as "FET 5"). The second line 26 is a wiring that connects the FET 2 and the electrode plate 24*d* of the capacitor 24*b* via a sixth switching element (hereinafter referred to as "FET 6").

The auxiliary power supply device 13 includes a third switching element (hereinafter referred to as "FET 3") and a fourth switching element (hereinafter referred to as "FET 4"). The FET 3 is provided between the second line 26 and the output port 21 and switches the connection between the second line 26 and the motor 10. The FET 4 is provided between the first line 23 and the output port 21 and switches the connection between the first line 23 and the motor 10. The FET 6 is connected to a connection point P1 provided between the FET 2 and the FET 3 on the second line 26 so as to switch the connection between the second terminal T2 and the second line 26. The connection point P2 provided on the first line 23 and between the FET 4 and the electrode plate 24*c* of the capacitor 24*a* is connected to a seventh switching element (hereinafter referred to as "FET 7"). The FET 7 switches the connection between the first terminal T1 and the ground. A connection point P3 provided on the first line 23 and between the chopper coil 25 and the FET 5 is connected to an eighth switching element (hereinafter referred to as "FET 8"). The FET 8 switches the connection between the second terminal T2 and the chopper coil 25.

Metal-oxide-semiconductor field-effect transistors (MOS-FETs) are employed as the FET 1 to the FET 8. The electronic control unit 14 is connected to gates of the FET 1 to the FET 8. The electronic control unit 14 outputs drive signals to the gates of the FET 1 to the FET 8, thereby switching the FET 1 to the FET 8 between an on state and an off state according to the drive signals. The electronic control unit 14 switches the auxiliary power source 24 to the serial connection mode or the parallel connection mode by switching the FET 1 to FET 8 to the on state or the off state.

A power supply control of the auxiliary power supply device 13 executed by the electronic control unit 14 will be described. FIG. 3 shows operation states of the FET 1 to the FET 8 of the auxiliary power supply device 13 in the charging state, the holding state, and a discharging state. The charging state is a state in which the power supply is controlled so that the auxiliary power source 24 is charged. The holding state is a state in which the power supply is controlled so that a charging voltage of the auxiliary power source 24 is held. The discharging state is a state in which the power supply is controlled so that power is discharged from the auxiliary power source 24. In the embodiment, there are two discharging states: a discharging state for boosting and a discharging state for backup. For boosting, a battery voltage Vb supplied from the in-vehicle battery 15 is boosted by a capacitor voltage Vc that is a discharge voltage of the auxiliary power source 24. For backup, the discharge voltage of the auxiliary power source 24 is boosted as the input voltage of the booster circuit 30, and the boosted discharge voltage is supplied to the motor 10. Thereby, even when the power supply from the in-vehicle battery 15 is interrupted, the power supply to the motor 10 can be continued.

The electronic control unit 14 determines the target steering assist force, which is the target value of the steering assist force, based on the steering torque TR and the traveling speed VS at the time of the power supply control. The electronic control unit 14 calculates a required voltage Vr that is a voltage necessary for the motor 10 to generate a steering assist force corresponding to the target steering assist force. The electronic control unit 14 switches a state of the power supply control among the charging state, the holding state, and the discharging state in accordance with the battery voltage Vb, the required voltage Vr, and a first voltage V1. The battery voltage Vb is a voltage of the power supplied from the in-vehicle battery 15 to the auxiliary power supply device 13. The first voltage V1 is a voltage at the connection point P1.

Figure 4:
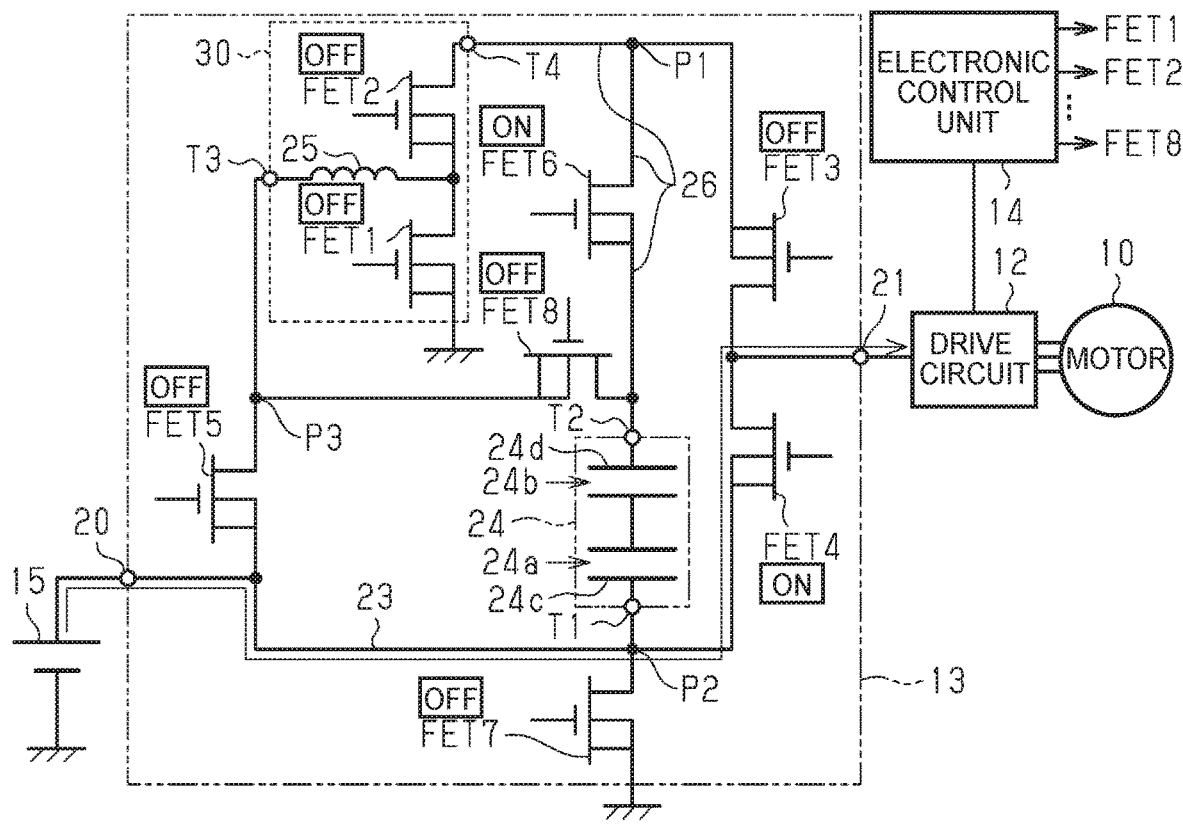
FIG. 4 is a circuit diagram showing the operating states of the switching elements of the auxiliary power supply device in a holding state.

As shown in FIGS. 3 and 4, the electronic control unit 14 switches the state of the power supply control to the holding state when the required voltage Vr is equal to or smaller than the battery voltage Vb and the first voltage V1 is equal to or larger than a specified maximum charging voltage. The maximum charging voltage is a voltage when the auxiliary power source 24 is fully charged. When switching the state of the power supply control to the holding state, the electronic control unit 14 turns off the FET 1 to the FET 3, the FET 5, the FET 7, and the FET 8, and turns on the FET 4 and the FET 6. In this case, since the FET 4 is turned on, the in-vehicle battery 15 is connected to the motor 10 via the first line 23. A second voltage V2 that is a voltage of the output port 21 of the auxiliary power supply device 13 is almost equal to the battery voltage Vb supplied from the in-vehicle battery 15. The battery voltage Vb of the in-vehicle battery 15 is supplied to the motor 10 via the first line 23. Meanwhile, since the FET 2, the FET 3, and the FET 8 are turned off, the electric charge accumulated in the auxiliary power source 24 is not discharged, and the charge voltage of the auxiliary power source 24 charged until then is held. Further, the booster circuit 30 is disconnected from the in-vehicle battery 15 because the FET 5 is turned off, and is disconnected from the auxiliary power source 24 because the FET 8 is turned off.

Figure 5:
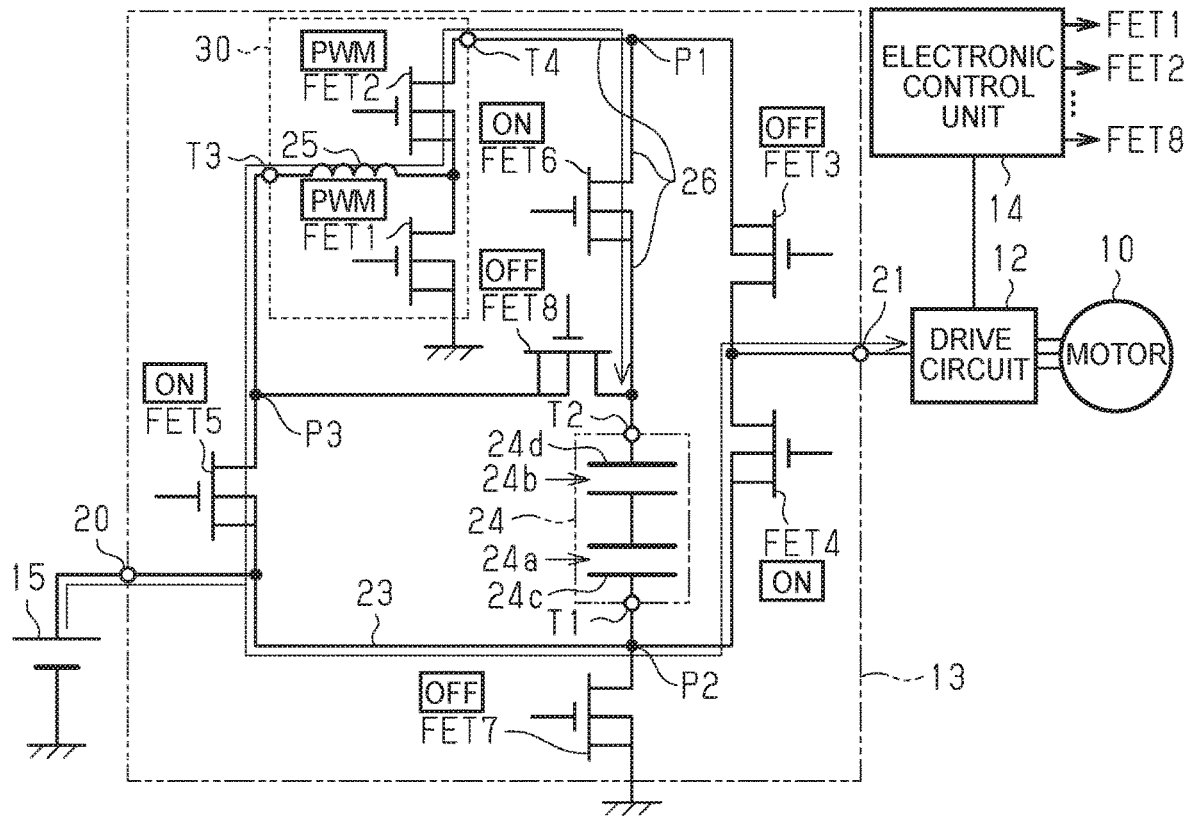
FIG. 5 is a circuit diagram showing the operating states of the switching elements of the auxiliary power supply device in a charging state.

As shown in FIGS. 3 and 5, the electronic control unit 14 switches the state of the power supply control to the charging state when the required voltage Vr is equal to or smaller than the battery voltage Vb and the first voltage V1 is smaller than the maximum charging voltage. When switching the state of the power supply control to the charging state, the electronic control unit 14 turns off the FET 3, the FET 7, and the FET 8 and turns on the FET 4 to the FET 6. Meanwhile, in the charging state, the electronic control unit 14 performs Pulse Width Modulation (PWM) driving so that the FET 1 and the FET 2 are alternately turned off. In this case, since the FET 4 is turned on, the in-vehicle battery 15 is connected to the motor 10 via the first line 23. The second voltage V2 that is the voltage of the output port 21 of the auxiliary power supply device 13 is almost equal to the battery voltage Vb supplied from the in-vehicle battery 15. The battery voltage Vb of the in-vehicle battery 15 is supplied to the motor 10 via the first line 23. Meanwhile, since the FET 5 and the FET 6 are turned on and the PWM driving is performed for the FET 1 and the FET 2, the auxiliary power source 24 is connected to the in-vehicle battery 15. Since the FET 5 is turned on, an input terminal T3 of the booster circuit 30 is connected to the in-vehicle battery 15, and since the FET 8 is turned off, the input terminal T3 of the booster circuit 30 is not connected to the second terminal T2 of the auxiliary power source 24. Meanwhile, since the FET 6 is turned on, an output terminal T4 of the booster circuit 30 is connected to the second terminal T2 of the auxiliary power source 24, and since the FET 3 is turned off, the output terminal T4 of the booster circuit 30 is not connected to the motor 10. Since the FET 4 to the FET 6 are turned on and the PWM driving is performed for the FET 1 and the FET 2, the battery voltage Vb that is the output voltage of the in-vehicle battery 15 is supplied to the auxiliary power source 24 via the chopper coil 25. The battery voltage Vb is input to the booster circuit 30 as the input voltage. The booster circuit 30 boosts the input battery voltage Vb to the first voltage V1, and outputs the boosted first voltage V1 as the output voltage. The auxiliary power source 24 is charged by the first voltage V1 boosted by the booster circuit 30.

Figure 6:
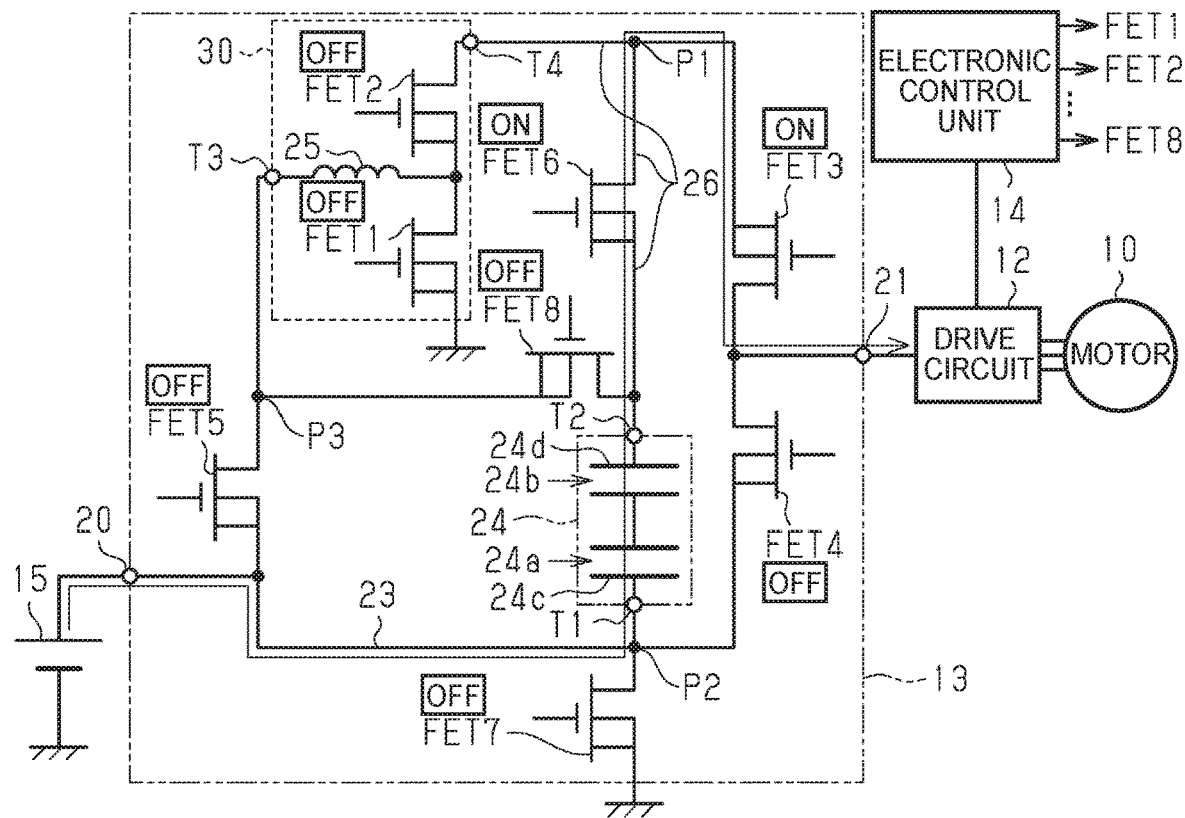
FIG. 6 is a circuit diagram showing the operating states of the switching elements of the auxiliary power supply device in a discharging state for boosting.

As shown in FIGS. 3 and 6, when the traveling speed VS is equal to or smaller than a traveling speed threshold VS0 and the actual current value I of the output port 21 is equal to or larger than a current threshold I0, the electronic control unit 14 switches the state of the power supply control to the discharging state for boosting. The traveling speed threshold VS0 is a threshold determined in view of determining whether it is not preferable to inevitably stop assisting the steering operation. A case where the traveling speed VS is equal to or smaller than the traveling speed threshold VS0 is a case where the vehicle is stopped or is traveling at a low speed. When the vehicle is stopped or is traveling at a low speed, as compared with the case where the vehicle is traveling at a high speed, an influence on a driver is small even when the assist of the steering operation is inevitably stopped. However, the required voltage Vr required by the EPS 1 for the motor 10 to generate the steering assist force corresponding to the target steering assist force is likely to increase. The current threshold I0 is a threshold determined in view of determining whether the actual current value I that actually flows through the output port 21 with the assist of the steering operation indicates a rapid steering operation. The actual current value I that is equal to or larger than the current threshold I0 indicates the rapid steering operation, and it can be considered that the required voltage Vr is exceeding the battery voltage Vb. When switching the state of the power supply control to the discharging state for boosting, the electronic control unit 14 turns off the FET 1, the FET 2, the FET 4, the FET 5, the FET 7, and the FET 8 and turns on the FET 3 and the FET 6. Thereby, the electronic control unit 14 switches the connection mode of the auxiliary power source 24 to the serial connection mode. When the auxiliary power source 24 is switched to the serial connection mode, the first terminal T1 of the auxiliary power source 24 is connected to the connection point P2 on the first line 23 and is connected to the in-vehicle battery 15 via the first line 23. Since the FET 3 and the FET 6 are turned on, the second terminal T2 of the auxiliary power source 24 is connected to the motor 10 via the second line 26. As a result, the battery voltage Vb of the in-vehicle battery 15 is supplied to the motor 10 via the first line 23, the auxiliary power source 24, and the second line 26. As described above, the in-vehicle battery 15 and the auxiliary power source 24 are connected in series, and the battery voltage Vb of the in-vehicle battery 15 is boosted by the capacitor voltage Vc that is a discharge voltage of the auxiliary power source 24 so as to be supplied to the motor 10. Since the in-vehicle battery 15 and the auxiliary power source 24 are connected in series, the total voltage of the battery voltage Vb and the capacitor voltage Vc is output from the second terminal T2 of the auxiliary power source 24. Thereby, the power supply to the motor 10 that is the power supply target is boosted.

Figure 7:
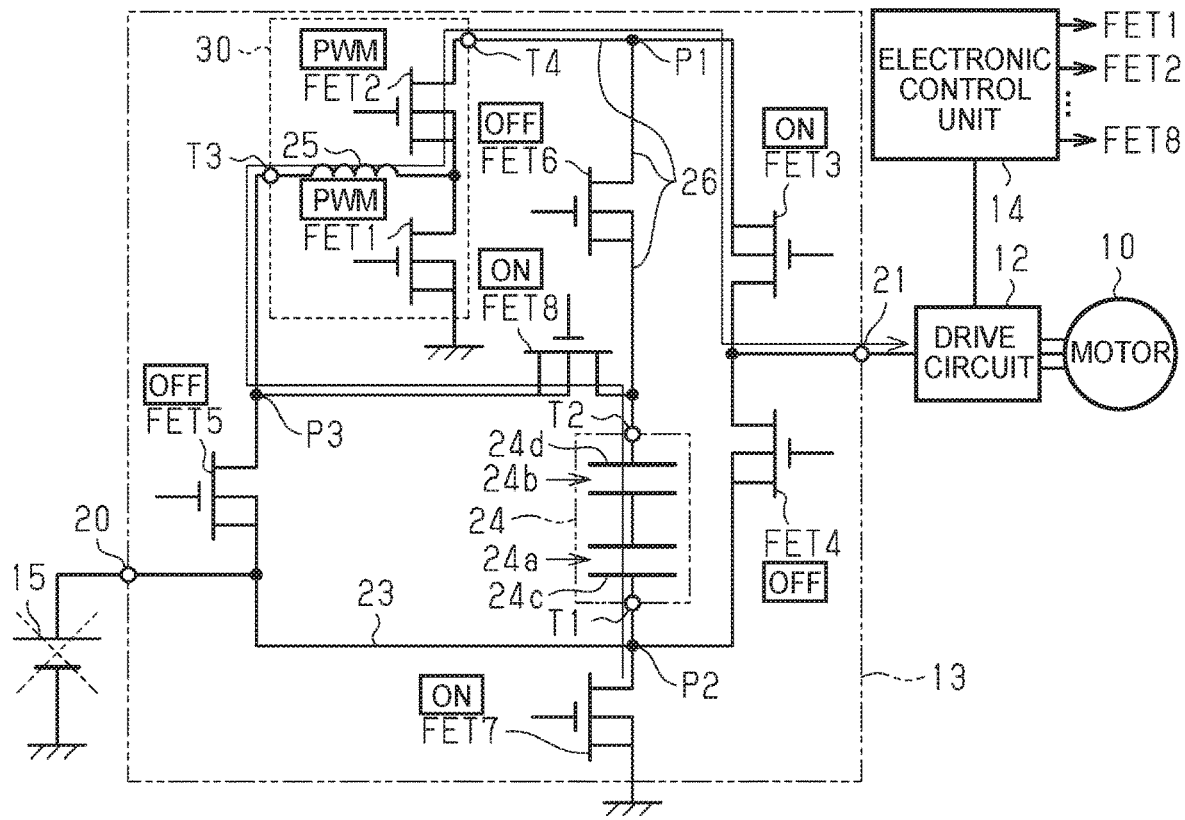
FIG. 7 is a circuit diagram showing the operating states of the switching elements of the auxiliary power supply device in a discharging state for backup.

As shown in FIGS. 3 and 7, when the traveling speed VS exceeds the traveling speed threshold VS0 and the required voltage Vr exceeds the battery voltage Vb, the electronic control unit 14 switches the state of the power supply control to the discharging state for backup. A case where the traveling speed VS exceeds the traveling speed threshold VS0 is a case where the vehicle is traveling at a high speed, and the required voltage Vr required by the EPS 1 for the motor 10 to generate the steering assist force corresponding to the target steering assist force is likely to decrease, but it is not preferable to stop assisting the steering operation. A case where the required voltage Vr exceeds the battery voltage Vb occurs when the in-vehicle battery 15 fails, such as when the in-vehicle battery 15 is disconnected and damaged or when the battery voltage Vb of the in-vehicle battery 15 is lower than a specified value. When switching the state of the power supply control to the discharging state for backup, the electronic control unit 14 turns off the FET 4 to the FET 6 and turns on the FET 3, the FET 7, and the FET 8. In the discharging state for backup, the electronic control unit 14 performs the PWM driving so that the FET 1 and the FET 2 are alternately turned off. Thereby, the electronic control unit 14 switches the connection mode of the auxiliary power source 24 to the parallel connection mode. When the auxiliary power source 24 is switched to the parallel connection mode, the FET 7 is turned on. Thus, when the auxiliary power source 24 is switched to the parallel connection mode, the first terminal T1 of the auxiliary power source 24 is connected to the connection point P2 and to the ground via the FET 7. Since the FET 8 is turned on, the second terminal T2 of the auxiliary power source 24 is connected to the input terminal T3 of the booster circuit 30. Since the FET 6 is turned off, the second terminal T2 of the auxiliary power source 24 is not connected to the connection point P1 on the second line 26, and thus is not connected to the output terminal T4 of the booster circuit 30. Since the FET 4 and the FET 5 are turned off, the battery voltage Vb of the in-vehicle battery 15 is not supplied to the motor 10. Since the FET 3 is turned on, the output terminal T4 of the booster circuit 30 is connected to the motor 10. Since the FET 3, the FET 7, and the FET 8 are turned on and the PWM driving is performed for the FET 1 and the FET 2, the capacitor voltage Vc that is the discharge voltage from the auxiliary power source 24 is supplied to the motor 10 via the chopper coil 25. The capacitor voltage Vc from the auxiliary power source 24 is input to the booster circuit 30 as the input voltage. The booster circuit 30 boosts the input capacitor voltage Vc to the first voltage V1, and outputs the boosted first voltage V1 as the output voltage. Thus, the motor 10 is supplied with the first voltage V1 boosted by the booster circuit 30.

A procedure for determining the state of the power supply control executed by the electronic control unit 14 will be described with reference to a flowchart. A determination process of the state of the power supply control is repeatedly executed at predetermined cycles. As shown in FIG. 8, the electronic control unit 14 determines whether the traveling speed VS is equal to or smaller than the traveling speed threshold VS0 (step S1).

When the traveling speed VS is equal to or smaller than the traveling speed threshold VS0 (YES in step S1), the electronic control unit 14 determines whether the actual current value I is equal to or larger than the current threshold I0 (step S2).

If the actual current value I is equal to or larger than the current threshold I0 (YES in step S2), the electronic control unit 14 switches the state of the power supply control to the discharging state for boosting (step S3). When the actual current value I is smaller than the current threshold I0 (NO in step S2), the electronic control unit 14 ends the process. In this case, the electronic control unit 14 switches the state of the power supply control to the holding state or the charging state.

When the traveling speed VS exceeds the traveling speed threshold VS0 (NO in step S1), the electronic control unit 14 determines whether the battery voltage Vb is equal to or smaller than the required voltage Vr (step S4).

When the battery voltage Vb is equal to or smaller than the required voltage Vr (YES in step S4), the electronic control unit 14 switches the state of the power supply control to the discharging state for backup (step S5).

When the battery voltage Vb exceeds the required voltage Vr (NO in step S4), the electronic control unit 14 ends the process. In this case, the electronic control unit 14 switches the state of the power supply control to the holding state or the charging state. [0041] The determination process of the state of the power supply control executed by the electronic control unit 14 is thus completed. The operation and effects of the embodiment will be described.

In order to make the circuit configuration of the auxiliary power supply device 13 compact, the auxiliary power source 24 can be switched between the serial connection mode in which the motor 10 that is the power supply target and the in-vehicle battery 15 are connected in series, and the parallel connection mode in which the first terminal T1 of the auxiliary power source 24 is connected to the connection point P2. In addition, the serial connection mode and the parallel connection mode share the same auxiliary power source 24. In other words, the shared auxiliary power source 24 is used for both backup and boosting. Assuming that the auxiliary power source 24 has a smaller power supply capacity than the in-vehicle battery 15 does, in the embodiment, the booster circuit 30 is used to boost the capacitor voltage Vc from the auxiliary power source 24 for backup. As a result, since all the auxiliary power sources 24 are in the discharging state for boosting, the power supply to the power supply target for backup is not backed up using an auxiliary power source with different charging states. For this reason, since it is possible to suppress variation in the capacitor voltage Vc, which is a discharge voltage from the auxiliary power source 24, it is possible to stabilize the discharge voltage from the auxiliary power source 24 for backup.

The shared booster circuit 30 is used for both backup and for charging the auxiliary power source 24. Thus, compared with the case where the booster circuit 30 used for charging the auxiliary power source 24 and the booster circuit 30 used for backup are separately provided in the auxiliary power supply device 13, the circuit configuration of the auxiliary power supply device 13 can be made further compact because the configuration of the booster circuit 30 is shared.

Thus, the EPS 1 capable of stabilizing the capacitor voltage Vc from the auxiliary power source 24 can be achieved. In addition, the embodiment may be modified as follows. The following other embodiments can be combined with each other within a technically consistent range.

The electronic control unit 14 determines whether the actual current value I is equal to or larger than the current threshold I0 in step S2 of FIG. 8. However, the disclosure is not limited thereto. For example, the electronic control unit 14 may make a determination based on whether the steering speed of the steering wheel 2 is equal to or larger than a predetermined threshold in step S2 of FIG. 8.

In FIG. 8, the electronic control unit 14 determines whether the traveling speed VS is equal to or smaller than the traveling speed threshold VS0 in step S1. However, this determination need not be made. In this case, for example, the electronic control unit 14 determines whether the battery voltage Vb is equal to or smaller than the required voltage Vr. When the battery voltage Vb is equal to or smaller than the required voltage Vr, the electronic control unit 14 switches the state of the power supply control to the discharging state for backup. In contrast, when the battery voltage Vb exceeds the required voltage Vr, the electronic control unit 14 determines whether the actual current value I is equal to or larger than the current threshold I0. When the actual current value I is equal to or larger than the current threshold I0, the electronic control unit 14 switches the state of the power supply control to the discharging state for boosting. When the battery voltage Vb exceeds the required voltage Vr and the actual current value I is smaller than the current threshold I0, the electronic control unit 14 ends the process. In this case, the electronic control unit 14 switches the state of the power supply control to the holding state or the charging state.

The current threshold I0 used in the determination process in step S2 of FIG. 8 may be determined in view of determining whether a load of the steering operation is large, including stationary steering. The electronic control unit 14 switches the state of the power supply control to the discharging state for backup when the in-vehicle battery 15 has failed. However, the electronic control unit 14 can switch the state of the power supply control to the discharging state for backup regardless of whether the in-vehicle battery 15 has failed.

At least one of or all of the switching elements (the FET 1 to the FET 8) may be constituted by switching elements other than the MOS-FETs. Examples of the switching elements other than the MOS-FETs include insulated-gate bipolar transistors (IGBTs).

The motor 10 is not limited to a three-phase brushless motor. For example, the motor 10 may be a brushed motor. In the embodiment, the booster circuit 30 used for charging the auxiliary power source 24 and the booster circuit 30 used for backup are shared, but the disclosure is not limited to this. That is, the booster circuit 30 used for backup may be provided separately from the booster circuit 30 used for charging the auxiliary power source 24.

In the embodiment, the current sensor 19 detects the actual current value I of the output port 21 of the auxiliary power supply device 13. However, the disclosure is not limited to this. For example, the current sensor 19 may detect the actual current value I of the input port 20.

In the embodiment, the auxiliary power source 24 of the auxiliary power supply device 13 includes two capacitors 24a, 24b, due to the relationship between the voltage required by the EPS 1 and the capacitances of the capacitors 24a and 24b. However, the number of capacitors may be changed as appropriate. For example, the auxiliary power source 24 may be composed of one capacitor or three or more capacitors.

In the embodiment, the lithium ion capacitor is used as the auxiliary power source 24. However, the disclosure is not limited to this. That is, the auxiliary power source 24 may be an electric double layer capacitor (EDLC), a lithium ion battery, or a lead storage battery.

In the embodiment, the EPS 1 is configured as an EPS in which the motor 10 is connected to the steering shaft 4 via the speed reducer 11. Alternatively, the EPS 1 may be configured as an EPS in which the motor 10 is connected to the rack shaft 5 via the speed reducer 11.

In the embodiment, the auxiliary power supply device 13 is applied to the EPS 1. Alternatively, the auxiliary power supply device 13 may be applied to an uninterruptible power supply device, an unmanned carrier, or an overhead power line.

What is claimed is:

1. An electric power steering system of a vehicle comprising:

a motor serving as a power supply target;

a main power source;

an auxiliary power supply device provided in a power supply path extending from the main power source to the motor and including an auxiliary power source and a booster circuit for boosting an input voltage; and an electronic control unit, wherein:

the electronic control unit is configured to:
- i) switch the auxiliary power source between a serial connection mode and a parallel connection mode, the serial connection mode being a mode in which a first terminal is connected to the main power source and a second terminal is connected to the motor, and the auxiliary power source is connected in series between the motor and the main power source, the parallel connection mode being a mode in which the first terminal is connected to a part between the main power source and the power supply target, at which the main power source and the power supply target are connected in series;
- ii) switch among a charging state for charging the auxiliary power source, a holding state for holding a charge voltage of the auxiliary power source, and a discharging state for discharging power from the auxiliary power source;
- iii) switch the auxiliary power source between the serial connection mode and the parallel connection mode; and
- iv) switch a state of a power supply control to the discharging state for boosting when: a traveling speed of a vehicle is less than or equal to a traveling speed threshold value and an actual current value at an output port or input port of an auxiliary power supply is greater than or equal to a current threshold value; or the traveling speed of the vehicle is less than or equal to the traveling speed threshold value and a steering speed of a steering wheel of the vehicle is greater than or equal to a predetermined threshold value, and the auxiliary power source is configured to:
- boost a voltage supplied from the main power source by a discharge voltage of the auxiliary power source to supply power to the motor when the electronic control unit switches the auxiliary power source to the serial connection mode, wherein the second terminal of the auxiliary power source is connected to an input terminal of the booster circuit, and the discharge voltage of the auxiliary power source, which is an input voltage of the booster circuit, is boosted; and when the traveling speed of a vehicle is greater than the traveling speed threshold value and a battery voltage of an on-board battery is less than or equal to a required voltage, which is a voltage required for a motor to generate target steering assist force, perform backup control to supply the boosted discharge voltage to the motor when the electronic control unit switches the auxiliary power source to the parallel connection mode.

2. An electric power steering system according to claim 1, wherein the electronic control unit is configured to switch the auxiliary power source to the parallel connection mode, when the auxiliary power source supplies power from the main power source to the power supply target, such that the second terminal is connected to an output terminal of the booster circuit, the input terminal of the booster circuit is connected to the main power source, an output voltage of the main power source, which is the input voltage of the booster circuit, is boosted, and the auxiliary power source is charged by the boosted output voltage.

* * * * *